Patented May 28, 1940

2,202,161

UNITED STATES PATENT OFFICE 2,202,161

PRODUCTION OF COMPOSITIONS CONTAINING COMPONENTS OF THE VITAMIN B COMPLEX

Carl S. Miner, Glencoe, Ill., assignor to Commercial Solvents Corporation, Terre Haute, Ind., a corporation of Maryland No Drawing. Application October 30, 1937, Serial No. 172,038

17 Claims. (Cl. 99—5)

My invention relates to the recovery of valuable constituents from fermentation residues obtained in butyl alcohol fermentation processes, and more particularly to the recovery from such residues of compositions containing components of the vitamin B complex.

The butyl alcohol fermentation process involves the fermentation of carbohydrate mashes of low concentration with the result that exceedingly large volumes of fermented mash must be processed for the recovery of relatively small volumes of butyl alcohol and other volatile products. Less than 3% by volume of solvents are recovered from the fermented mashes and the residue from a large fermentation plant may thus constitute millions of gallons of distillery slop per day. In the past such residues have been investigated from the standpoint of utilization as fertilizers, feeds, and the like, but it has been found to be uneconomical to attempt to recover or concentrate the solid constituents for such purposes in view of the tremendous amount of water to be evaporated.

Until recently the distillery slop in the butyl alcohol fermentation industry merely constituted a waste product which was run to the rivers for disposal. However, in view of increasingly stringent requirements with respect to stream pollution the distillery slop has become not only a waste product but actually an item of considerable expense. The butyl alcohol distillery slops present serious difficulties from the standpoint of sewage disposal, and extended investigation has brought forth no satisfactory and economical method of treating these wastes. Even when taking into account the offsetting cost of sewage disposal, recovery of solids from the distillery slops for fertilizer purposes was not found to be economical. A similar situation was encountered with respect to the production of feeds, particularly in the case of the slops from molasses mashes commonly utilized in the industry today. Thus, it can readily be calculated that the amounts of nitrogen, mineral elements, vitamins, and other food constituents included in the initial molasses mash would not warrant the evaporation of such large quantities of water, even if none of these constituents were lost in the fermentation or distillation steps of the process.

However, I have now made the surprising discovery that the vitamin content of the fermentation residue far exceeds the vitamin content of the initial mash, and is sufficient to warrant the recovery of vitamin compositions from even such dilute solutions. I have demonstrated that, contrary to all prior belief, the butyl alcohol producing bacteria actually synthesize vitamins during the fermentation of carbohydrate mashes, and that relatively large amounts of vitamins of the B complex are thus produced.

It is well known that the vitamin originally designated as B constitutes a complex containing a number of separate factors which have been variously designated in the art. The antineuritic factor which functions in carbohydrate metabolism has been uniformly designated as $B_1$, but there has previously been some confusion as to the designations of the other factors. The antipellagra factor has been designated by different investigators as the P—P factor, vitamin $B_2$ or vitamin G, but will be referred to herein as vitamin $B_2$. The growth factor has been designated as vitamin $B_2$, vitamin G, or flavin (lacto-flavin or riboflavin), but will be referred to herein as vitamin G. Certain other factors such as vitamin $B_4$, vitamin $B_6$, and the W factor of the vitamin B complex have not been sufficiently identified or standardized to be treated herein as separate components of the vitamin B complex.

The various components of the vitamin B complex are essential to normal animal growth and are important constituents of a complete feed ration. Up to the present time yeast and liver have constituted the main sources of these vitamins although the separate components are found in substantial concentrations in certain other natural materials such as rice hulls, milk, and whey. However, vitamin B preparations have been unduly expensive when derived from any of these sources. In accordance with the present invention, on the other hand, compositions containing components of the vitamin B complex, suitable for incorporation in animal feeds and for other uses in the art, are readily and economically obtainable.

I have discovered that components of the vitamin B complex may be synthesized by the action on carbohydrate mashes of any of the various types of butyl alcohol producing bacteria (i. e., bacteria capable of producing primarily butyl alcohol with varying proportions of other neutral solvents such as ethyl alcohol, isopropyl alchol and acetone). As examples of such bacteria there may be mentioned Clostridium acetobutylicum (Weizmann) of U. S. Pat. 1,315,585; Clostridium roseum of Arch. f. Mikrobiol 6, 230–238; the bacteria of the group Clostridium saccharo-acetobutylicum, described in United States Patent No. 2,089,522 of Woodruff et al.; the bacteria of the group Clostridium inverto ace-

*tobutylicum*, described in United States Patent No. 2,089,562 of Legg et al.; *Clostridium saccharo acetobutylicum-beta* and *Clostridium saccharo acetobutylicum-gamma*, described in United States Patent No. 2,050,219 of Arzberger; the bacteria of the group *Clostridium propyl butylicum*, described in copending application U. S. Ser. No. 115,003 of Muller, filed December 9, 1936, now Patent No. 2,132,039, issued October 4, 1938; the bacteria of the group *Clostridium saccharobutyl-acetonicum-liquefaciens*, described in copending application U. S. Ser. No. 124,691 of Arzberger, filed February 8, 1937, now Patent No. 2,139,108, issued Dec. 6, 1938; and *Clostridium saccharo-butyl-acetonicum-liquefaciens - gamma* and *Clostridium saccharo-butyl-acetonicum-liquefaciens-delta*, described in co-pending application U. S. Ser. No. 124,686 of Carnarius et al., filed February 8, 1937, now Patent No. 2,139,111, issued Dec. 6, 1938.

When fermentable carbohydrate mashes are subjected to the action of any of the bacteria mentioned above, or other butyl alcohol producing bacteria, biological assay of the initial mash and of the fermented mash definitely establishes a synthesis of components of the vitamin B complex ranging from 200% to more than 500% of the vitamins in the initial mash. The vitamins thus produced may be recovered in any suitable manner as, for example, simply by recovering the residual solids by evaporation. Concentrates of high potency may be secured by extraction or adsorption procedures or other methods utilized for securing these vitamins from other sources, but simple concentration or recovery of the residual solids will usually be sufficient to secure materials which are highly useful in the art. Thus, I have found that solids recovered simply by evaporation from molasses mashes which had been fermented by butyl alcohol bacteria contain vitamin B components in concentrations equal to or greater than the concentrations of the corresponding components in bakers' yeast, dried milk, or whey powder. Biological assay of recovered solids from such fermentations has shown concentrations of vitamin $B_1$ equivalent to 5 to 8 international units per gram in standard rat feeding tests, utilizing the growth determination method of the vitamin committee of the American Drug Manufacturing Association with the international standard as the reference control. Chick feeding tests in accordance with the method of Kline et al. (Jour. of Biological Chemistry 99, 295) have shown the vitamin $B_2$ content to be at least equal to that of bakers' yeast, with 3% concentration in the feed ration giving ample protection against pellagra. Rat feeding tests by the Bourquin-Sherman method have demonstrated concentrations of vitamin G ranging from 10 to 25 or more Bourquin-Sherman units per gram of material, and chick feeding experiments by the method of Bethke et al. (Poultry Science 16, 175) have shown vitamin G concentrations equivalent to 35 to 70 micrograms of flavin per gram of material. It is thus apparent that the vitamin compositions secured merely by recovering residual solids from the fermented mashes are of sufficient potency to be utilized for the nutritional purposes, and for other uses in the art. However, it is clear that concentrates of much higher potency, or even in some cases the pure crystalline vitamins, may be secured from these recovered solids by the usual methods employed for this purpose.

In carrying out my invention a carbohydrate mash is subjected to the action of the butyl alcohol producing bacteria in the normal manner utilized for the production of butyl alcohol and other volatile products. Any fermentable carbohydrate mash of the types previously employed for the particular bacteria involved may be utilized, and the fermentation may be effected under known conditions for fermentation by such bacteria. Suitable mashes may, for example, be prepared from molasses and water together with such auxiliary nutrients, neutralizing agents, buffer salts, and the like, as have previously been employed in this type of fermentation. Any fermentable carbohydrate may be employed in the mash, but my process is particularly adapted to the use of the cheap commercial sources of sugar, such as blackstrap cane molasses, high test cane molasses, beet molasses, and the like. Although alkali metal or alkaline earth metal compounds may be employed to control the pH during the fermentation, I prefer to use ammonium compounds or free ammonia for this purpose. In this way the salt content of the final recovered solids is much reduced, with resulting improved properties of the product for feeding purposes and greater ease of concentration or recovery of pure vitamins.

At the conclusion of the fermentation the residual solids may be concentrated by any suitable procedure, either simultaneously with or subsequent to separation of the volatile products. If only the heat stable vitamin components are to be recovered, the butyl alcohol and other volatile products may be removed by distillation in the usual manner, and the residual solids may then be recovered from the distillation slop. However, if the heat labile vitamin components are desired, evaporation at lower temperatures than the common distillation temperatures should preferably be employed, in which case the volatile products may be recovered by distillation of the evaporator condensate. The solids in the fermented mash or distillation slop may be concentrated by settling and decanting off the clear upper liquid layer, or by evaporation as, for example, by the use of a multiple effect evaporator. The resulting concentrate may then be dried to a solid mass by evaporation in pans or by the use of rotary drum driers, vacuum driers, spray driers, or the like. Alternatively, the material may be reduced to a solid form in a single step by spray evaporation. In general, it may be said that any of the common means for recovering solids from liquids, which would not tend to adversely affect the vitamins by unduly high temperatures or otherwise, may be employed for this purpose. It will be evident from the above discussion that my invention is capable of numerous modifications of procedure, the only essential element being the recovery of residual solids from the fermented mash either in a liquid concentrate or in a dry form by any means not injurious to the vitamin content.

My invention may be illustrated by the following specific examples:

Example I

A mash was prepared by diluting high test cane molasses (sugar 67.8% as sucrose) to a sugar concentration of approximately 67.5 grams per liter with water, and sufficient grain alcohol distillery slop and molasses butyl alcohol distillery slop so that the distillery slop content of the final mash constituted 60% by volume of butyl slop and 19% by volume of ethyl slop. Approximately 0.1 gram per liter of ammonia was introduced into the mash which was then inoculated with an active culture of *Clostridium saccharo butyl-acetonicum-liquefaciens-delta* and incubated at 30° C. for 40 hours. Approximately 0.8 gram per liter of additional ammonia was introduced into the mash in a series of small additions during the first 16 hours of the fermentation. At the conclusion of the fermentation the fermented mash was evaporated under a vacuum of 27 to 28 inches at about 70° C. to a liquid having a solids content of approximately 35% which was further evaporated at approximately 50° C. to a solid material having a moisture content of approximately 10%.

This material was biologically assayed for vitamin G by rat feeding tests in accordance with the Bourquin-Sherman procedure, and it was found that a daily dose of 40 milligrams was amply sufficient to induce the required gain in weight in the test animals. The material was also biologically assayed for vitamin G in chick feeding tests carried out in accordance with the procedure of Bethke et al. (Poultry Science 16, 175). These tests showed that the incorporation of 3% by weight of this material in a feed ration containing no vitamin G was sufficient to insure normal growth in the test animals and eliminate any symptoms of flavin deficiency. The material was also biologically assayed for vitamin $B_2$ in chick feeding tests carried out in accordance with the method of Kline et al. (Jour. Biological Chemistry 99, 295). In this case it was found that the material when incorporated in a feed ration deficient in vitamin $B_2$ would completely prevent pellagra in a concentration of 3% by weight in the feed, being equally as effective as bakers' yeast for this purpose.

Example II

A mash was prepared and fermented as in Example I utilizing an active culture of *Clostridium saccharo butylacetonicum-liquefaciens-gamma* as the inoculant for the fermentation. At the conclusion of the fermentation the fermented mash was distilled to remove volatile products and approximately 1.33 gm. $Ca(OH)_2$ per liter was added to the hot distillation slop. After cooling, the supernatant liquid was decanted off, and the lower portion containing the settled solids, amounting to approximately one-third of the original volume, was then evaporated under a vacuum of 27 to 28 inches at about 70° C. to a liquid having a solids content of approximately 35%, which was further evaporated at approximately 50° C. to a solid material having a moisture content of approximately 10%. This material was biologically assayed for vitamin G by rat feeding tests in accordance with the Bourquin-Sherman procedure, and it was found that a daily dose of 67 milligrams was amply sufficient to induce the required gain in weight in the test animals.

Example III

A mash consisting solely of an aqueous solution of inverted high test molasses, nutrient salts, and buffer salts, containing approximately 51.5 grams sugar per liter in the form of monose sugars resulting from the inversion of approximately 71.5 grams per liter of high test Cuban molasses, was inoculated with an active culture of *Clostridium propyl butylicum* and incubated at 30° C. for 70 hours. At the conclusion of this period the fermented mash was evaporated in pans on a steam bath to a semi-solid material which was then dried at 50° C. to a moisture content of approximately 11%. This material was biologically assayed for vitamin G in accordance with the Bourquin-Sherman procedure, and it was found that a daily dose of 67 milligrams was amply sufficient to induce the required gain in weight of the test animals. This assay showed that the solids from one liter of fermented mash contained approximately 284 Bourquin-Sherman units of vitamin G. Simultaneous biological assay of the molasses utilized in the mash showed the presence of less than 1 Bourquin-Sherman unit of vitamin G per gram. After subtracting the maximum number of units which could have been introduced by the molasses of the initial mash, i. e., 69 units, the synthesis of vitamin G in this fermentation thus amounted to at least 212.5 Bourquin-Sherman units per liter.

Example IV

A mash consisting solely of an aqueous solution of inverted high test molasses, nutrient salts, and buffer salts, containing approximately 52.5 grams sugar per liter in the form of monose sugars resulting from the inversion of approximately 73.0 grams per liter of high test Cuban molasses, was inoculated with an active culture of *Clostridium inverto-acetobutylicum* and incubated at 30° C. for 70 hours. At the conclusion of this period the fermented mash was evaporated in pans on a steam bath to a semi-solid material which was then dried at 50° C. to a moisture content of approximately 13%. This material was biologically assayed for vitamin G in accordance with the Bourquin-Sherman procedure, and it was found that a daily dose of 57 milligrams was amply sufficient to induce the required gain in weight of the test animals. This assay showed that the solids from one liter of fermented mash contained approximately 254.5 Bourquin-Sherman units of vitamin G. After subtracting the maximum number of units which could have been introduced by the molasses of the initial mash, based on the molasses assay of Example III, the synthesis of vitamin G in this fermentation thus amounted to at least 181.5 Bourquin-Sherman units per liter of mash.

Example V

A mash consisting solely of an aqueous solution of high test molasses, nutrient salts, and buffer salts, containing approximately 50 grams sugar per liter in the form of approximately 69.4 grams per liter of uninverted high test Cuban molasses, when inoculated with an active culture of *Clostridium saccharo acetobutylicum-alpha* and incubated at 30° C. for 60 hours. At the conclusion of this time the fermented mash was evaporated in pans on a steam bath to a semi-solid material which was then dried at 50° C. to a moisture content of approximately 12%. This material was biologically assayed for vitamin G in accordance with the Bourquin-Sherman procedure, and it was found that a daily dose of 50 milligrams was amply sufficient to induce the required gain in weight in the test animals. This assay showed that the solids from one liter of fermented mash contained approximately 326.8 Bourquin-Sherman units of vitamin G. After subtracting the maximum number of units which could have been introduced by the molasses in the initial mash, based on the molasses assay of Example III, the synthesis of vitamin G in this fermentation thus amounted to at least 257.4 Bourquin-Sherman units per liter of mash.

Example VI

A mash consisting solely of an aqueous solution of high test molasses, nutrient salts, and buffer salts, containing approximately 50.2 grams sugar per liter in the form of approximately 69.7 grams per liter of uninverted high test Cuban molasses, was inoculated with an active culture of *Clostridium saccharo acetobutylicum-gamma* and incubated at 30° C. for 60 hours. At the conclusion of this time the fermented mash was evaporated in pans on a steam bath to a semi-solid material which was then dried at 50° C. to a moisture content of approximately 13%. This material was biologically assayed for vitamin G in accordance with the Bourquin-Sherman procedure, and it was found that a daily dose of 67 milligrams was amply sufficient to induce the required gain in weight in the test animals. This assay showed that the solids from one liter of fermented mash contained approximately 275.2 Bourquin-Sherman units of vitamin G. After subtracting the maximum number of units which could have been introduced by the molasses of the initial mash, based on the molasses assay of Example III, the synthesis of vitamin G in this fermentation thus amounted to at least 205.5 Bourquin-Sherman units per liter of mash.

Example VII

A mash consisting solely of an aqueous solution of high test molasses, nutrient salts, and buffer salts, containing approximately 69.0 grams sugar per liter in the form of approximately 95.9 grams per liter of uninverted high test Cuban molasses, was inoculated with an organism of the group *Clostridium saccharo butyl-acetonicum-liquefaciens* and incubated at 30° C. for 60 hours. At the conclusion of this time the fermented mash was evaporated in pans on a steam bath to a semi-solid material which was then dried at 50° C. to a moisture content of approximately 13%. This material was biologically assayed for vitamin G in accordance with the Bourquin-Sherman procedure, and it was found that a daily dose of 50 milligrams was amply sufficient to induce the required gain in weight in the test animals. This assay showed that the solids from one liter of fermented mash contained approximately 511.0 Bourquin-Sherman units of vitamin G. After subtracting the maximum number of units which could have been introduced by the molasses of the initial mash, based on the molasses assay of Example III, the synthesis of vitamin G in this fermentation thus amounted to at least 415.1 Bourquin-Sherman units per liter of mash.

Example VIII

A mash consisting solely of pure sugars, grain alcohol distillery slop, nutrient salts, and buffer salts, containing approximately 14.8 grams glucose ("cerelose"), 48.2 grams sucrose, and 600 milliliters of distillery slop per liter, was inoculated with an active culture of *Clostridium saccharo butyl-acetonicum-liquefaciens-delta* and incubated at 30° C. for 64 hours. At the conclusion of this period the fermented mash was evaporated in pans on a steam bath to a semi-solid material which was then dried at 50° C. to a moisture content of approximately 10%. This material was biologically assayed for vitamin G in accordance with the Bourquin-Sherman procedure, and it was found that a daily dose of 67 milligrams was amply sufficient to induce the required gain in weight in the test animals. This assay showed that the solids from one liter of fermented mash contained approximately 384.0 Bourquin-Sherman units of vitamin G. After subtracting the maximum number of units which could have been introduced by the grain alcohol distillery slop in the initial mash, on the basis of a separate assay of this material, the synthesis of vitamin G in this fermentation amounted to at least 304.4 Bourquin-Sherman units per liter of mash.

Example IX

A mash consisting solely of an aqueous solution of blackstrap molasses, nutrient salts, and buffer salts, containing approximately 67.3 grams sugar per liter in the form of uninverted beet molasses was inoculated with an active culture of *Clostridium saccharo butyl-acetonicum-liquefaciens-delta* and incubated at 30° C. for 44 hours. At the conclusion of this time the fermented mash was evaporated in pans on a steam bath to a semi-solid material which was then dried at 50° C. to a moisture content of approximately 10%. This material was biologically assayed for vitamin G in accordance with the Bourquin-Sherman procedure, and it was found that a daily dose of approximately 83 milligrams was sufficient to induce the required gain in weight of the test animals. This assay showed that the solids from one liter of fermented mash contained approximately 486.0 Bourquin-Sherman units of vitamin G. Simultaneous biological assay of the molasses utilized in the mash showed the presence of not more than 1 Bourquin-Sherman unit of vitamin G per gram. After subtracting the maximum number of units which could have been introduced by the molasses in the initial mash, the synthesis of vitamin G in this fermentation thus amounted to at least 353.3 Bourquin-Sherman units per liter of mash.

Example X

A mash consisting solely of an aqueous solution of high test molasses, nutrient salts, and buffer salts, containing approximately 70.0 grams sugar per liter in the form of approximately 103.2 grams per liter of uninverted high test Cuban molasses, was inoculated with an active culture of *Clostridium saccharo butyl-acetonicum-liquefaciens-delta* and incubated at 30° C. for 42 hours. At the conclusion of this time the fermented mash was evaporated in pans on a steam bath to a semi-solid material which was then dried at 50° C. to a moisture content of approximately 10%. This material was biologically assayed for vitamin G in accordance with the Bourquin-Sherman procedure, and it was found that a daily dose of approximately 50 milligrams was sufficient to induce the required gain in weight of the test animals. This assay showed that the solids from one liter of fermented mash contained approximately 528.0 Bourquin-Sherman units of vitamin G. After subtracting the maximum number of units which could have been introduced by the molasses in the initial mash, based on the molasses assay of Example III, the synthesis of vitamin G in this fermentation thus amounted to at least 424.8 Bourquin-Sherman units per liter of mash. The dried concentrate obtained from this fermentation was also biologically assayed for vitamin B₁ in rat feeding growth tests in accordance with the procedure recommended by the U. S. P. Vitamin Committee (Bulletin #27). This assay showed that a minimum daily dose of 125 milligrams to 200 milligrams was sufficient to induce the required growth recovery in test animals which had been maintained on a diet deficient in vitamin B₁.

The residual solids from butyl alcohol fermentations, obtained as above described or in any other suitable manner, may be employed for any purpose for which other compositions containing components of the vitamin B complex are employed in the art. These residual solids may be incorporated with any vitamin deficient materials to provide components of the B complex. The concentrated solids are particularly useful in supplying vitamins in animal feed rations or for human consumption, for which purposes the concentrates may merely be admixed in suitable amounts with nutrient materials deficient in these vitamins. Concentrates obtained after distillation of the fermentation residue to remove volatile products, containing the heat stable components of the vitamin B complex, are highly useful in providing vitamin G for nutritional purposes and for supplying vitamin G in any compositions deficient in this factor. In any such cases the concentrate of the residual solids may merely be mixed with the vitamin deficient material, and for this purpose a solid concentrate may be employed or a liquid concentrate may be used if the moisture content introduced thereby is not undesirable in the final product. In either case the moisture content of the final product should preferably be maintained at at least 5% in order to reduce the tendency for decomposition of the vitamin components in the material.

The concentrates of the residual solids obtained in accordance with my invention are also useful for the production of highly concentrated vitamin compositions, in which case the vitamins may be recovered from the concentrated solids by solvent extraction or by other means used in the art for this purpose, and highly purified vitamin compositions of high potency may readily be obtained.

Although the production of the various factors such as the growth factor, the anti-neuritic factor, and the anti-pellagra factor, in accordance with the process of my invention has been experimentally demonstrated, these various factors have not been chemically identified. For convenience herein, and in the appended claims, these factors have been designated by the names of vitamins for which they have been found to be the equivalents in biological assays. It should be definitely understood, however, that my invention relates to the production of these factors as identified only by their biological characteristics, and is not to be construed as limited to the production of any particular chemical compounds which may be identified with the vitamin designations herein employed.

It is also to be understood, of course, that my invention is not to be limited to the specific examples given above or to any particular procedure disclosed. My invention is applicable generally to the recovery of compositions containing components of the vitamin B complex from fermentation residues obtained by the action of any of the butyl alcohol producing bacteria on fermentable carbohydrate mashes. The residual solids from the fermented mash may be concentrated by any procedure which is not detrimental to their vitamin content, and the resulting concentrates may be further purified in any desired manner. Various modifications of the procedures specifically described herein will readily occur to those skilled in the art, and it is to be understood that any such modifications and the use of any equivalents are included within the scope of my invention.

My invention now having been described, what I claim is:

1. A vitaminizing product for supplying components of the vitamin B complex, comprising a preparation of the fermentation residue of a vegetable carbohydrate containing mash fermented by butyl alcohol producing bacteria, containing butyl synthesized components of the vitamin B complex in a concentration substantially exceeding dietetic requirements with respect to the other materials present therein.

2. A vitaminizing product for supplying vitamin G, comprising a preparation of the fermentation residue of a vegetable carbohydrate containing mash fermented by butyl alcohol producing bacteria, containing butyl synthesized vitamin G in a concentration substantially exceeding dietetic requirements with respect to the other materials present therein.

3. A product according to claim 1 in which the carbohydrate is molasses.

4. A product according to claim 2 in which the carbohydrate is molasses.

5. A vitaminizing preparation for supplying components of the vitamin B complex to animal food deficient therein, comprising concentrated distillation slop, from a butyl alcohol fermentation of a vegetable carbohydrate containing mash, in the form of a solid material containing butyl synthesized components of the vitamin B complex in a concentration to supply the said vitamin deficiency when admixed with said food in relatively small amounts.

6. A vitaminizing preparation for supplying vitamin G to animal food deficient therein, comprising concentrated distillation slop, from a butyl alcohol fermentation of a vegetable carbohydrate containing mash, in the form of a solid concentrate containing butyl synthesized vitamin G in a concentration to supply the said vitamin G deficiency when admixed with said food in relatively small amounts.

7. A product according to claim 5 in which the carbohydrate is molasses.

8. A product according to claim 6 in which the carbohydrate is molasses.

9. In a process for synthesizing components of the vitamin B complex, the steps which comprise fermenting a fermentable vegetable carbohydrate containing mash by the action of butyl alcohol producing bacteria and treating the fermented residue to obtain a vitamin concentrate substantially more potent than dried butyl residue.

10. A process according to claim 9 in which the carbohydrate is molasses.

11. A process according to claim 17 in which the carbohydrate is molasses.

12. In a process for the production of concentrates of components of the vitamin B complex, the steps which comprise synthesizing said vitamins by fermenting a fermentable vegetable carbohydrate containing mash with butyl alcohol producing bacteria, and concentrating said vitamin components in the mash by separating volatile constituents from the mash at temperatures below those destructive of said vitamin components.

13. A process according to claim 12 in which the carbohydrate is molasses.

14. The process of making an animal food composition dietetically adequate with respect to vitamin G which comprises supplying the vitamin G by adding thereto a preparation of butyl fermentation residue containing butyl synthesized vitamin G.

15. An animal food composition dietetically adequate with respect to vitamin G and with respect to a nutrient material in which butyl fermentation residue is deficient which comprises said nutrient material and as the source of vitamin G a non-toxic proportion of a preparation of butyl fermentation residue containing butyl synthesized vitamin G.

16. An animal food ration dietetically adequate with respect to vitamin G comprising nutrient material deficient in vitamin G in combination with a relatively small amount of a preparation of butyl fermentation residue containing butyl synthesized vitamin G for supplying the deficiency in vitamin G.

17. A process for synthesizing and recovering vitamin G, comprising fermenting a fermentable vegetable carbohydrate containing mash by the action of butyl alcohol producing bacteria and recovering the residual solids from the fermented mash without substantial destruction of the vitamin G content thereof.

CARL S. MINER.